(12) United States Patent
Liu et al.

(10) Patent No.: US 9,144,770 B2
(45) Date of Patent: Sep. 29, 2015

(54) REVERSIBLE SORBENT FOR WARM CO2 CAPTURE BY PRESSURE SWING ADSORPTION

(71) Applicant: Massachusetts Institute of Technology, Cambridge, MA (US)

(72) Inventors: Zan Liu, Cambridge, MA (US); William H. Green, Belmont, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 14/491,015

(22) Filed: Sep. 19, 2014

(65) Prior Publication Data

US 2015/0110696 A1   Apr. 23, 2015

Related U.S. Application Data

(62) Division of application No. 14/059,556, filed on Oct. 22, 2013.

(60) Provisional application No. 61/718,807, filed on Oct. 26, 2012.

(51) Int. Cl.
| | |
|---|---|
| *B01D 53/62* | (2006.01) |
| *B01J 20/32* | (2006.01) |
| *B01J 20/20* | (2006.01) |
| *B01J 20/04* | (2006.01) |
| *B01J 20/34* | (2006.01) |
| *B01J 20/28* | (2006.01) |
| *B01D 53/02* | (2006.01) |
| *B01D 53/047* | (2006.01) |

(52) U.S. Cl.
CPC ............... *B01D 53/62* (2013.01); *B01D 53/02* (2013.01); *B01J 20/041* (2013.01); *B01J 20/20* (2013.01); *B01J 20/28057* (2013.01); *B01J 20/3204* (2013.01); *B01J 20/3236* (2013.01); *B01J 20/3416* (2013.01); *B01J 20/3491* (2013.01); *B01D 53/047* (2013.01); *B01D 2251/402* (2013.01); *B01D 2253/1124* (2013.01); *B01D 2257/504* (2013.01); *Y02C 10/04* (2013.01); *Y02C 10/08* (2013.01)

(58) Field of Classification Search
CPC ............................. B01D 53/62; B01J 20/3236
USPC ........................................................ 252/192
See application file for complete search history.

(56) References Cited

U.S. PATENT DOCUMENTS

| | | | |
|---|---|---|---|
| 6,280,503 B1 | 8/2001 | Mayorga | |
| 2007/0000385 A1* | 1/2007 | Stouffer | ........................ 95/136 |
| 2008/0056971 A1* | 3/2008 | Hughes | ........................ 423/220 |

OTHER PUBLICATIONS

Solomon et al., Climate Change 2007—The Physical Science Basis, 2007. pp. 665-670, Cambridge University Press, UK.
DOE/EIA International Energy Outlook 2001; 2011, US.
Frey et., Improved system integration for integrated gasification combined cycle (IGCC) systems, Environmental science & technology 2006, 1693-9, 40, American Chemical Society, US.

(Continued)

*Primary Examiner* — Peter F Godenschwager
(74) *Attorney, Agent, or Firm* — Sam Pasternack; MIT Technology Licensing Office

(57) ABSTRACT

Sorbent for reversible warm $CO_2$ capture. The sorbent includes activated carbon impregnated with magnesium oxide, wherein the magnesium oxide constitutes at least 5% by weight of the sorbent.

2 Claims, 7 Drawing Sheets

(56) References Cited

OTHER PUBLICATIONS

Schlather et al., Desulfurization Process versus Traditional Scrubbers for a Warm Syngas Cleanup Technologies, In Gasification Technologies Conference; 2007.

Amelio et al., Integrated gasification gas combined cycle plant with membrane reactors; Technological and economical analysis, Energy Conversion and Management, 2007, 2660-2693, 48, Elsevier, Netherlands.

Kreutz et al., CO2 Sequestration From IGCC Power Plants by Means of Metallic Membranes, 2007, 129, 123-134, ASME, US.

Grainger et al., Techno-economic evaluation of a PVAm CO2-selective membrane in an IGCC power plant with CO2 capture, Fuel 2008, 87. 14-24, Elsevier, Netherlands.

Couling et al., Analysis of Membrane and Absorbent Processes for Warm Syngas Cleanup in Integrated Gasification Combined-Cycle Power with CO2 Capture and Sequestration. Ind. Eng. Chem. Res. 2011, 50, 11313-11336, American Chemical Society, US.

UPAC Reporting Physisorption Data for Gas/Solid Systems with Special Reference to the Determination of Surface Area and Porosity (Recommendations 1984) Pure & Appl. Chem. 1985, 57, 603-619, IUPAC, UK.

Sircar, Isosteric heats of multicomponent gas adsorption on heterogeneous absorbents. Langmuir 1991, 7, 3065-3069, American Chemical Society, US.

Sircar et al., Isosteric Heat of Adsorption: Theory and Experiement. J. Phys. Chem. B 1999, 103, 6539-6546, American Chemical Society, US.

Leon et al., Adsorption of CO2 on Hydrotaicite-Derived Oxides: Sorption Mechanisms and Consequences for Adsorption Irreversibility. Ind. Eng. Chem. Res. 2010, 49, 3663-3671, American Chemical Society, US.

Siriwardane et al., Novel Regenerable Magnesium Hydroxide Sorbents for CO2 Capture at Warm Gas Temperatures. Ind. Eng. Chem. Res. 2009, 48, 2135-2141, American Chemical Society, US.

Kyaw et al., Applicability of zeolite for CO2 storage in a CaO-CO2 high temperature energy storage system. Energy Conversion and Management 1997, 38, 1025-1033, Pergamon, UK.

Diaz et al., Enhancements of the CO(2) retention capacity of X zeolites by Na- and Cs-treatments. Chemosphere 2008, 70, 1375-82, Elsevier, Netherlands.

Diaz et al., Enhancements of the CO 2 Retention Capacity of Y Zeolites by Na and Cs Treatments: Effect of Adsorption Temperature and Water Treatment. Ind. Eng. Chem. Res. 2008, 47. 412-418, American Chemical Society, US.

Beruto et al., Thermodynamics and Kinetics of Carbon Dioxide Chemisorption on Calcium Oxide. J. Phys. Chem 1984. 88, 4052-4055, American Chemical Society, US.

Filitz et al., Highly efficient CO2 sorbents: development of synthetic, calcium-rich dolomites. Environmental science & technology 2012. 46, 559-565, American Chemical Society, US.

Nakagawa et al., A Novel Method of CO2 Capture from High Temperature Gases J. Electrochem. Soc 1998, 145, 1344-1346, US.

Bretado et al., A new synthesis route to Li4SiO4 as CO2 catalytic/sorbent. Catalysis Today 2005. 107-108, 863-867, Elsevier, Netherlands.

Gauer et al., Doped lithium orthosificate for absorption of carbon dioxide. Journal of Materials Science 2006, 41, 2405-2409, Springer Science+Business Media, US.

Siriwardane et al., Novel Regenerable Sodium-Based Sorbents for CO 2 Capture at Warm Gas Temperatures. Energy & Fuels 2007. 21, 2088-2097, American Chemical Society, US.

Ding et al., Equilibria and kinetics of CO2 adsorption on hydrotalcite absorbent. Chemical Engineering Science 2000, 55, 3461-3474, Pergamon, UK.

Yong et al., Hydrotalcite-like compounds as adsorbents for carbon dioxide. Energy Conversion and Management 2002, 43, 1865-1876, Pergamon, UK.

Singh et al., High temperature materials for CO2 capture. Energy Procedia 2009, 1, 623-630, Elsevier, Netherlands.

Van Selow et al., Carbon Capture by Sorption-Enhanced Water-Gas Shift Reaction Process using Hydrotalcite-Based Material. Industrial & Engineering Chemistry Research 2009, 48, 4184-4193, American Chemical Society, US.

Van Selow et al.,Improved sorbent for the sorption-enhanced water-gas shift process. Energy Procedia 2011, 4, 1090-1095, Elsevier, Netherlands.

Larson et al., Large-scale gasification-based coproduction of fuels and electricty from switchgrass. Biofuels, Bioproducts and Biorefining 2009, 3, 174-194, Wiley InterScience, US.

Chiesa et al., Co-production of hydrogen, electricity and CO from coal with commercially ready technology. Part A: Performance and emissions. International Journal of Hydrogen Energy 2005, 30, 747-767, Elsevier, Netherlands.

Kreutz et al., Co-production of hydrogen, electricity, and CO from coal with commercially ready technology. Part B Economic analysis, International Journal of Hydrogen Energy 2005, 30, 769-784, Elsevier, Netherlands.

\* cited by examiner

REVERSIBLE SORBENT FOR WARM CO2 CAPTURE BY PRESSURE SWING ADSORPTION

This application is a divisional of U.S. non-provisional application Ser. No. 14/059,556 filed on Oct. 22, 2013 and also claims priority to provisional application Ser. No. 61/718,807 filed Oct. 26, 2012 the contents of which are incorporated herein by reference.

BACKGROUND OF THE INVENTION

This invention related to $CO_2$ capture and more particularly to a sorbent capable of capturing $CO_2$ at warm temperatures.

There is a growing consensus that global warming is caused by anthropogenic $CO_2$ emission[1]. Among all sources, a coal-fired power plant represents the largest point source for $CO_2$ emission[2]. But at the same time, coal is the most inexpensive and most abundant fossil fuel[3]. Thus, in the near future, although renewable energy and nuclear energy will play increasing roles, coal will remain a major component of the energy portfolio, especially in developing counties[3]. Facing this dilemma, technologies are needed to utilize coal with higher energy efficiency and lower $CO_2$ emission. Currently, integrated gasification combined cycle with carbon capture and sequestration (IGCC with CCS) is one of the most promising candidates for achieving this goal[4]. IGCC has two important features compared with a traditional pulverized coal (PC) plant[5]. First, because of the combined cycle, IGCC can achieve higher energy efficiency. Second, the gas stream has higher pressure which facilitates the capture of sulfur, mercury, nitride oxide, particulate and $CO_2$, making emission control less expensive.

Currently, the state-of-the-art $CO_2$ capture process for IGCC is scrubbing the gas stream with physical or chemical solvents, such as MEA, Rectisol or Selexol. These solvent-based absorption processes need to operate at fairly low temperatures. Thus, the gas stream coming from a water gas shift reactor must be significantly cooled down, which leads to high energy loss and high capital costs both for the compressors used for cooling and for heat recuperation. A study carried out by DOE/NETL[5,6], which assumed Selexol for carbon capture, indicated a reduction in net power output and a corresponding reduction in HHV thermal efficiency of 6%-9% as compared to a base case of IGCC with no carbon capture. It would be very desirable to reduce the parasitic energy load and operating costs associated with the traditional low-temperature $CO_2$ capture process. Prior studies have assessed high temperature $CO_2$ separation processes[7,8], such as $H_2$-permeable membranes[9,10], $CO_2$-premeable membrane[11], and pressure swing adsorption (PSA)[12], and identified opportunities to significantly improve the efficiency. A more recent study[13] in our group extended previous analyses to compare a variety of novel separation methods for IGCC with CCS, namely sorbents and membranes, on a unified basis. Our computational approach identified pressure swing adsorption operated at warm gas temperatures (200-300° C.) could be potentially more efficient compared with other approaches. However, no sorbent was yet reported to be applicable in this temperature range.

Widely used in the oil and chemical industry, pressure swing adsorption[20] (PSA) of gases onto solid sorbents provides some key advantages, such as low energy requirements, low costs, and ease of applicability. In spite of these advantages, there have been only a few studies related to regenerable sorbents of $CO_2$ at 200-300° C. in the literature. To be applicable to a PSA process in the desired temperature range, the sorbent needs to maintain a regenerable sorbent capacity, fast kinetics, and low heat of adsorption. The commercially available sorbents such as activated carbon, zeolites, and alumina lose their adsorption properties at temperatures higher than 150° C., Super activated carbon[21] can maintain sufficient capacity at temperatures as high as 220° C., but the $CO_2/N_2$ selectivity is low. Basic zeolites[22,23] obtained by doping with electropositive ions were also tested for this purpose, but showed poor performance in the presence of other polar gases such as $SO_2$ and steam.

Some inorganic materials have also been proposed in the literature for carbon capture at an elevated temperature, such as calcium oxide[24,25], lithium zirconate[26], lithium silicate[27,28], sodium-based sorbent[29], hydrotalcite-like compounds (HTls)[30,31] and double salt sorbent[32]. Calcium oxide demonstrated high capacity even, at 700° C., but suffered from poor regenerability, slow kinetics and an extremely large heat requirement. Lithium-based materials can capture $CO_2$ in the 450-550° C. range, but suffer from slow sorption kinetics. Sodium-based materials showed good adsorption in the 200-400° C. range, but the materials can only be regenerated at 700° C., and so are not suitable for pressure swing adsorption. Double salt sorbent shows extremely high capacity at high temperature, but it is very hard to produce reproducible samples[33]. Recently, DOE/NETL reported a magnesium hydroxide based sorbent[19], which has a large capacity in the 200-300° C. range, and can be regenerated at 375° C. But the re-generation via thermal treatment is still not desirable for our purpose. In addition, the breakthrough curve of this sorbent indicates slow sorption kinetics which could arise from the very low surface area of the sorbent. Among such inorganic materials, HTls stand out as the most promising candidate for warm $CO_2$ capture, and they have been widely studied for sorption-enhanced water gas shifter reaction[34,35]. Hydrotalcite-like compounds consist of positively-charged brucite (MgOH)-like layers balanced by hydrated anions. The most common type is Mg—Al—$CO_3$, in which stacked layers of magnesium hydroxide [$Mg(OH)_2$] in which some of the divalent cations ($Mg^{2+}$) are substituted by trivalent cations ($Al^{3+}$) at the centers of octahedral sites of the hydroxide sheets. HTls are often promoted with $K_2CO_3$ to improve their performance in the presence of high pressure steam. These two classes of materials after calcination have been widely studied for $CO_2$ capture at high temperatures (350-500° C.).

This patent application has as an object to develop a new sorbent for $CO_2$ with good regenerability, fast kinetics and low heat of adsorption that can be applied in a PSA process in a warm temperature range. The material prepared through incipient wetness impregnation has a large surface area and pore size which facilitates the rapid adsorption of $CO_2$. Through the detailed study of sorbent capacity, multi-cycle regenerability, sorption rate and comparisons with HTls, we demonstrate here that the sorbent disclosed herein is a candidate for warm $CO_2$ capture by the PSA process.

SUMMARY OF THE INVENTION

According to the invention, a sorbent for reversible warm $CO_2$ capture includes a high surface area support material impregnated with MgO, wherein the MgO constitutes at least 5% by weight of the sorbent. A preferred high surface area support material is activated carbon. In a preferred embodiment, MgO constitutes approximately 15% by weight. MgO in the range of 5-15% is suitable for uses in the invention. It is preferred that the sorbent material disclosed herein be made using an incipient wetness impregnation method. In a preferred embodiment, a magnesium precursor is a soluble magnesium salt such as magnesium nitrate.

The sorbent disclosed herein has good regenerability, fast kinetics, and low heat of adsorption that can be applied in a pressure swing adsorption process at a warm temperature range.

DESCRIPTION OF THE PREFERRED EMBODIMENT

The sorbent material of the invention was synthesized using the incipient wetness impregnation method, which has been widely adopted for preparing heterogeneous catalysts. Those of skill in the art will recognize that other methods for depositing MgO on the support may be used including co-precipitation, sol gel method, electrolytic processing, and chemical vapor deposition. An MgO/carbon sorbent can be made in one step using $MgCl_2$ as a chemical activation reagent for activated carbon production. This process makes the production cost very low, which is a key factor when choosing a sorbent. To achieve the best performance, different magnesium precursors (nitrate, citrate, acetate, oxalate) were tested and compared. Nitrate was finally chosen as the precursor. Several preparation conditions, such as precursor concentration, support materials, calcination temperature and time were also studied to determine the optimal preparation procedure. The finalized impregnation procedure is as follows: 3.8 M solution of $Mg(NO_3)_2$ (from Sigma Aldrich) was added dropwise to preheated activated carbon (DARCO®, from Sigma Aldrich), to reach the desired MgO loading (15% by weight in a preferred embodiment). The as-prepared material was first dried for 12 h in open air, and was further dried in an oven at 100° C. for another 12 h. The material was finally calcined in a muffle furnace at 500° C. for 3 h under pure nitrogen.

It is recognized that other high surface area supports beyond activated carbon may be used in the present invention including Metal-Organic Frameworks (MOF), zeolites, activated alumina and mesoporous silica. Some of these support materials might require modification of the impregnation method such as, for example, to use a nonaqueous solvent rather than water.

Figure 1:
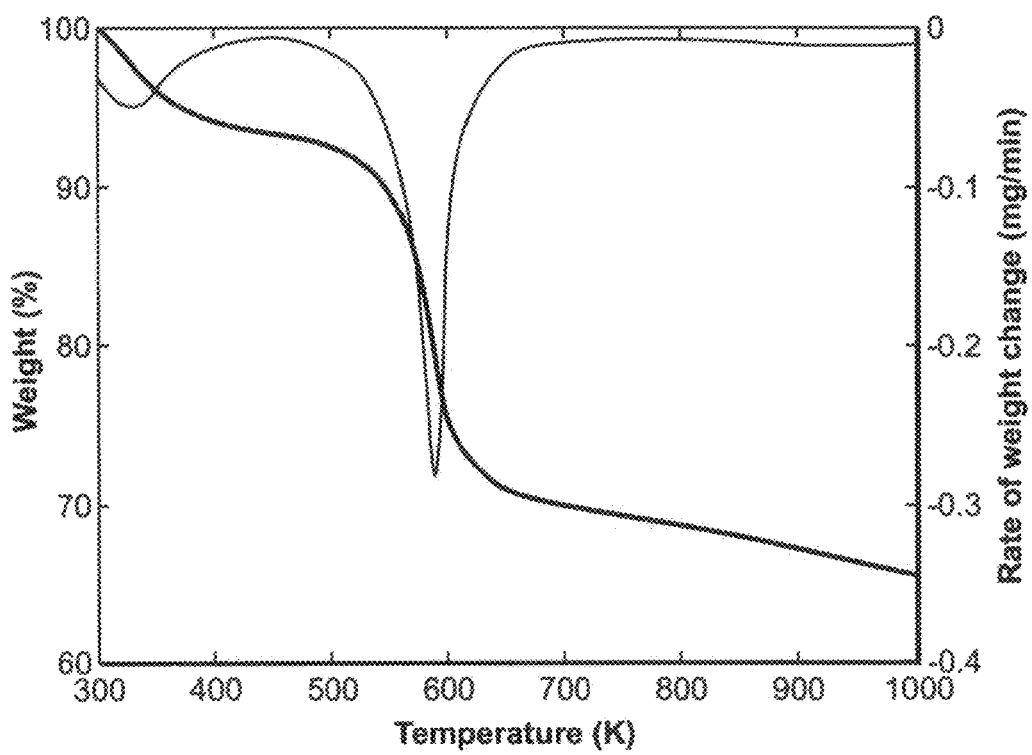
FIG. 1 is a thermogravimetric diagram of the formation of the sorbent disclosed herein from a precursor material.

The formation of the sorbent from the supported magnesium precursor was characterized by thermogravimetric analysis (TGA) in a thermogravimetric analyzer (Q500 TGA, TA Instruments). The typical thermogravimetric profile of the material is shown in FIG. 1. The material showed three decomposition steps leading to the corresponding sorbent. A first region showed water loss with a broad peak from 350K-450K. Most of the loosely held water in the precursor was lost before the materials reached 463 K. The second region (450K-700 K) showed an intense endothermic peak which corresponds to decomposition of magnesium nitrate to magnesium oxide. The third region (700K-900K) has no observable peak, and the small weight change might arise from the weight loss of the carbon support. A temperature of 750K was finally chosen as the calcination temperature, as this would ensure the minimum sintering and complete decomposition of magnesium nitrate.

Figure 2:
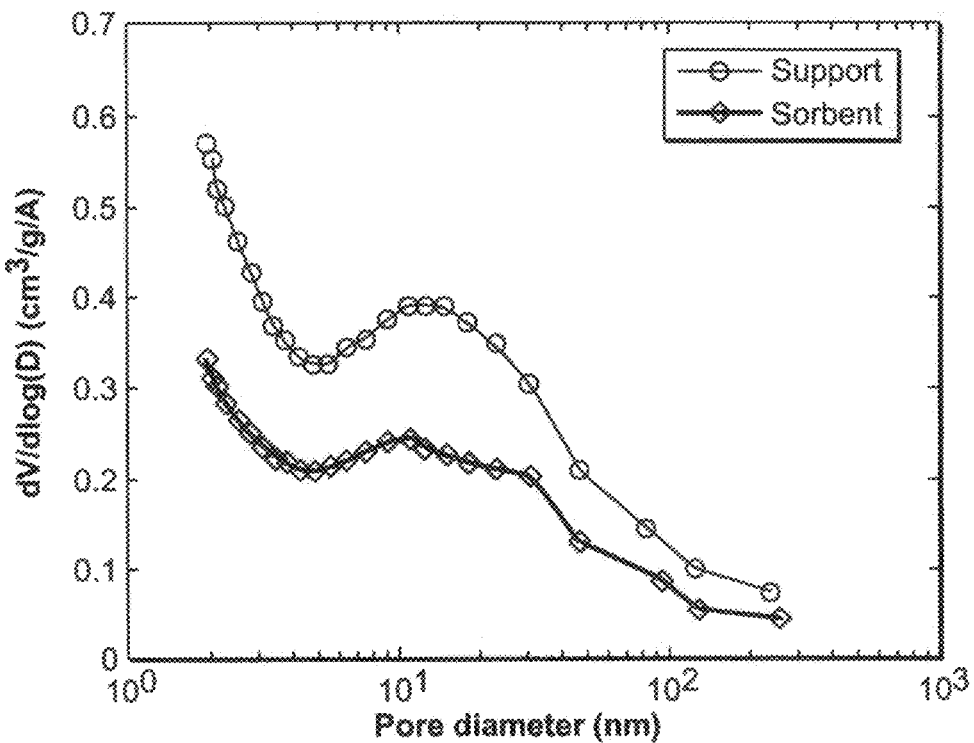
FIG. 2 is a graph showing the pore size distribution of an embodiment of the support and sorbent disclosed herein.

The surface area and pore size distribution of the sorbent were determined by $N_2$ adsorption-desorption isotherms at 77 K on a Micromeritics ASAP 2020 instrument. The surface areas and average pore diameters (Dp) were calculated using the Brunauer-Emmett-Teller (BET) method. The pore size distributions and pore volumes (Vp), between 170 and 300 nm, were determined from the desorption branch using the Barrett-Joyner-Halenda (BJH) method. See FIG. 2.

Figure 3:
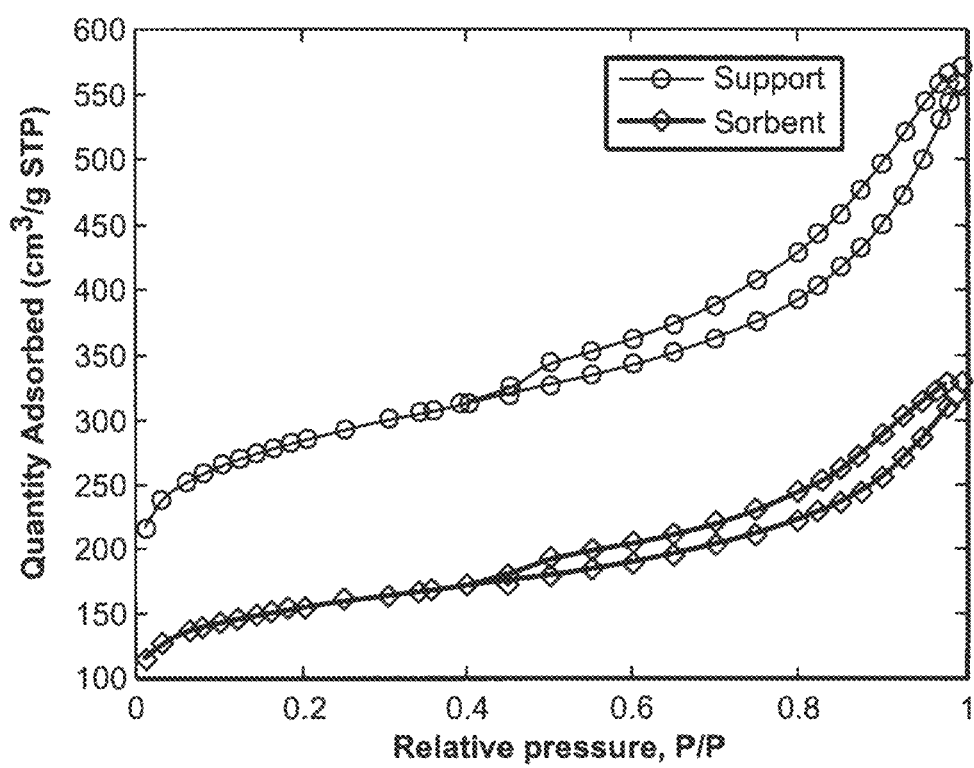
FIG. 3 is a graph of quantity adsorbed as a function of relative pressure for $N_2$ sorption-desorption tests.

As shown in FIG. 3, both of the materials show characteristic hysteresis loops of the type IV isotherm[14], which is associated with capillary condensation taking place in mesopores. This type of isotherm is very common in mesoporous industrial adsorbents.

Analysis of the hysteresis loops indicates that samples synthesized by incipient wetness impregnation did not exhibit any limiting adsorption at high relative pressure, which is characteristic of type H3 hysteresis loops, corresponding to aggregates of plate-like particles giving rise to slit-shaped pores[14]. In general, the porous structure patterns measured by BET were maintained after the impregnation and the subsequent thermal treatment despite the observed decreases in surface area.

The morphological properties of the support and sorbent are summarized in Table 1. As expected, heat treatment of the samples reduced their specific surface areas and mesopores volumes. But the average pore diameter does not change significantly. These values ensure that the pore size is not limiting with respect to the subsequent $CO_2$ adsorption studies. The total volume was contributed mostly from mesoporosity volume.

TABLE 1

Summary of morphological data for the support and sorbent

| | BET surface area (m2/g) | Total pore volume (cm3/g) | V_2 nm-300 nm (cm3/g) | Dp (nm) |
|---|---|---|---|---|
| Support | 978 | 0.82 | 0.55 | 6.84 |
| Sorbent | 532 | 0.48 | 0.34 | 6.93 |

Figure 4:
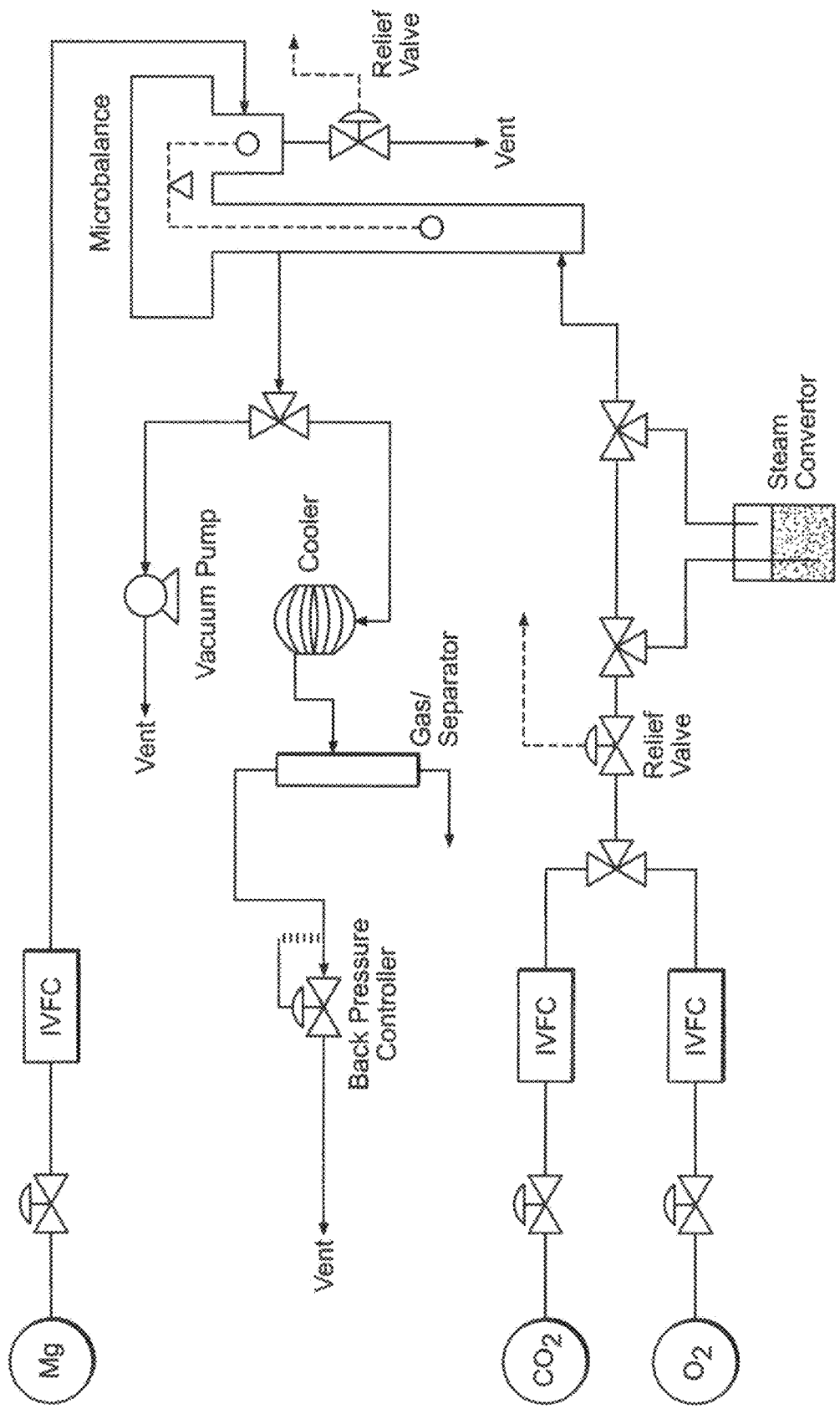
FIG. 4 is a schematic diagram of a high pressure microbalance system.

The measurements of sorption capacity and cyclic stability of the sorbent were performed in a high pressure microbalance shown in FIG. 4 (D110, from THASS company, Germany) and a TGA analyzer (Q 500 TGA, TA Instruments). A buoyancy correction has been considered.

The combined isotherm containing reversible and irreversible components was first determined, and the sample was then evacuated to remove only the reversibly adsorbed $CO_2$. The adsorption isotherm was then measured again, yielding the reversible adsorption only. The irreversible adsorption was determined by the difference between the total isotherms and reversible isotherm at different pressure points. The capacity for reversible and irreversible adsorption at different temperatures are summarized in Table 2.

TABLE 2

Capacity at different temperature and pressure (mmol $CO_2$/g Sorbent)

| Pressure | T = 180° C. | | T = 200° C. | | T = 220° C. | | T = 240° C. | |
|---|---|---|---|---|---|---|---|---|
| atm | Reversible | Irreversible | Reversible | Irreversible | Reversible | Irreversible | Reversible | Irreversible |
| 3 | 0.6416 | 0.2386 | 0.5595 | 0.2064 | 0.4775 | 0.2235 | 0.4438 | 0.1648 |
| 4 | 0.7803 | 0.2481 | 0.7004 | 0.2159 | 0.5909 | 0.2159 | 0.5615 | 0.1761 |
| 5 | 0.9002 | 0.2689 | 0.8097 | 0.2386 | 0.6876 | 0.2311 | 0.6518 | 0.1913 |
| 6 | 0.9969 | 0.3011 | 0.9211 | 0.2424 | 0.7780 | 0.2462 | 0.7296 | 0.2121 |
| 7 | 1.1189 | 0.3011 | 1.0347 | 0.2557 | 0.8769 | 0.2576 | 0.8306 | 0.2178 |
| 8 | 1.2410 | 0.3068 | 1.1442 | 0.2633 | 0.9779 | 0.2765 | 0.9232 | 0.2292 |
| 9 | 1.3273 | 0.3106 | 1.2200 | 0.2803 | 1.0579 | 0.2803 | 0.9927 | 0.2311 |
| 10 | 1.4200 | 0.3220 | 1.3106 | 0.2898 | 1.1422 | 0.2917 | 1.0707 | 0.2462 |
| 11 | 1.4959 | 0.3371 | 1.3864 | 0.3011 | 1.1992 | 0.3049 | 1.1318 | 0.2443 |
| 12 | 1.5697 | 0.3428 | 1.4645 | 0.3106 | 1.2835 | 0.2992 | 1.2141 | 0.2443 |
| 13 | 1.6436 | 0.3485 | 1.5342 | 0.3106 | 1.3490 | 0.3049 | 1.2816 | 0.2557 |
| 14 | 1.7028 | 0.3655 | 1.6081 | 0.3163 | 1.4082 | 0.3144 | 1.3555 | 0.2424 |
| 15 | 1.7788 | 0.3598 | 1.6652 | 0.3295 | 1.4800 | 0.3125 | 1.4232 | 0.2405 |
| 16 | 1.8865 | 0.3580 | 1.7813 | 0.3163 | 1.5793 | 0.3163 | 1.5056 | 0.2462 |

Concerning the effect of temperature, it was observed that the capacity of the adsorption decreases as the temperature increases, because high temperature shifts the adsorption reaction equilibrium. The reversible adsorption capacity shows a strong dependence on the partial pressure of $CO_2$, and the trend can be fitted to a Langmuir model with good precision. The irreversible adsorption capacity reaches a relatively high value even at a low pressure, and the pressure increase does not significantly increase the irreversible adsorption capacity. The irreversible adsorption sites get saturated even at lower pressure, suggesting the irreversible adsorption arises from a strong chemical reaction, which is sharply different from the reaction mode contributing to the reversible adsorption.

For a practical pressure swing absorption sorbent, we care only about the reversible adsorption, because only reversible components would contribute in a real application. A reversible adsorption isotherm at four different temperatures was measured in the high pressure microbalance, and the measurement has been corrected by considering buoyancy effects.

$$n_i^0 = \frac{a\exp(b/T)P}{1 + c\exp(d/T)P} \quad \text{Equation 1}$$

Figure 5:
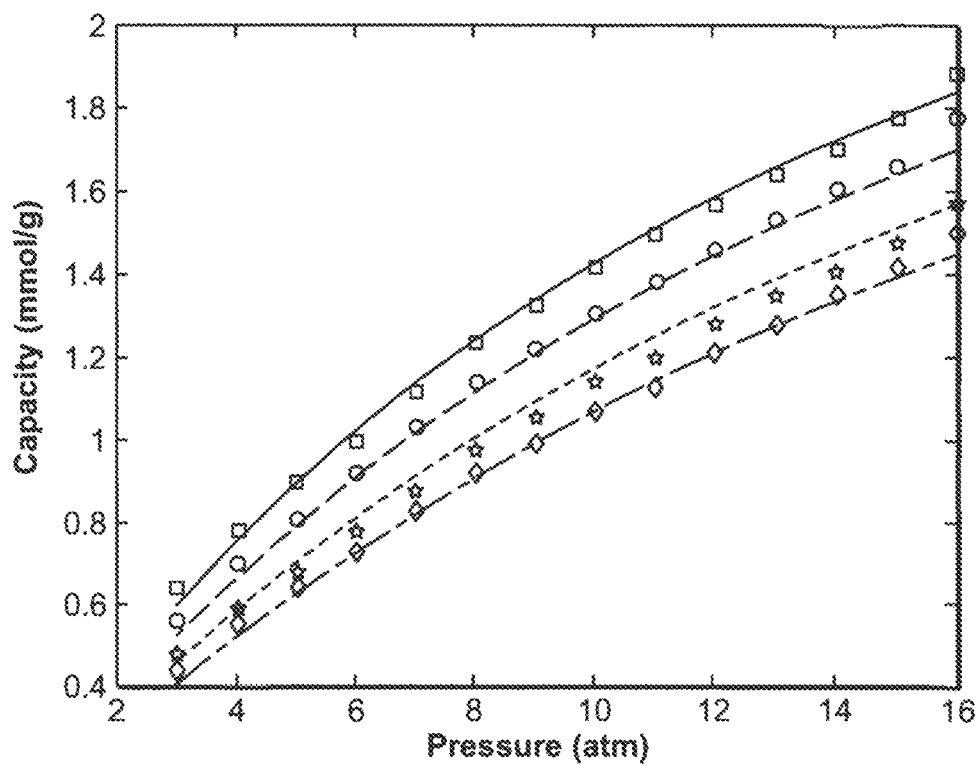
FIG. 5 is a graph of capacity versus pressure showing reversible adsorption isotherms at various temperatures.

A temperature-dependent Langmuir model (Equation 1) was adopted to fit the isotherm data. As shown in FIG. 5, the model captures the shape and temperature-dependent behavior.

Figure 6:
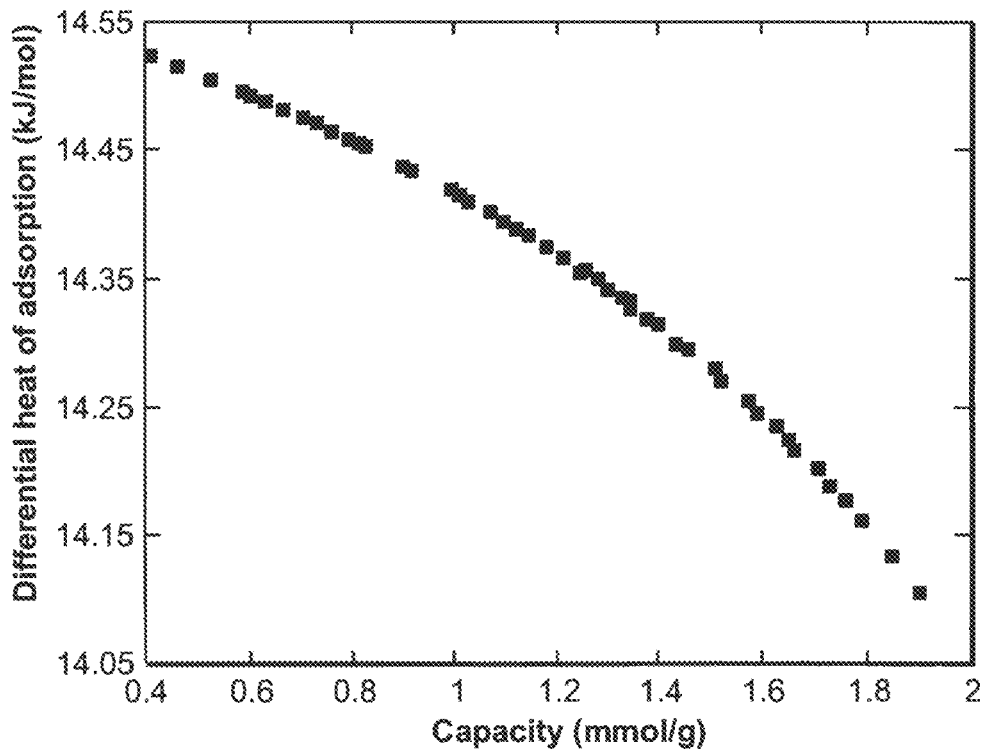
FIG. 6 is a graph of differential heat of adsorption against capacity showing that heat of adsorption has a weak dependence on loading.

The heat of adsorption is rigorously derived in the literature[15-17] as shown in Equation 2, where $n_i^0$ is the capacity. Once a temperature-dependent equilibrium isotherm is established, the heat of adsorption can be theoretically derived from an isotherm model based on Equation 3. The heat of adsorption for this sorbent is shown in FIG. 6, which is consistent with reported data[18]. The value is very close to the enthalpy of reaction between magnesium hydroxide and $CO_2$[19] which is consistent with the analysis concerning the correlation between reaction mode and reversibility[18].

$$q_i^0 = RT^2 \left[\frac{\partial \ln P}{\partial T}\right]_{n_i^0} \quad \text{Equation 2}$$

$$q_i^0 = -R\left(\frac{\partial n_i^0}{\partial(1/T)}\right)_P \bigg/ \left(\frac{\partial n_i^0}{\partial \ln P}\right)_T \quad \text{Equation 3}$$

As stressed above, to be applicable in the pressure swing adsorption process, regenerability is an important property. To study the adsorption reversibility, an 84-cycle test was performed in a high pressure microbalance. The temperature was maintained at 200° C. The sorption step was at 13 atm and the desorption was at 1 atm.

Figure 7:
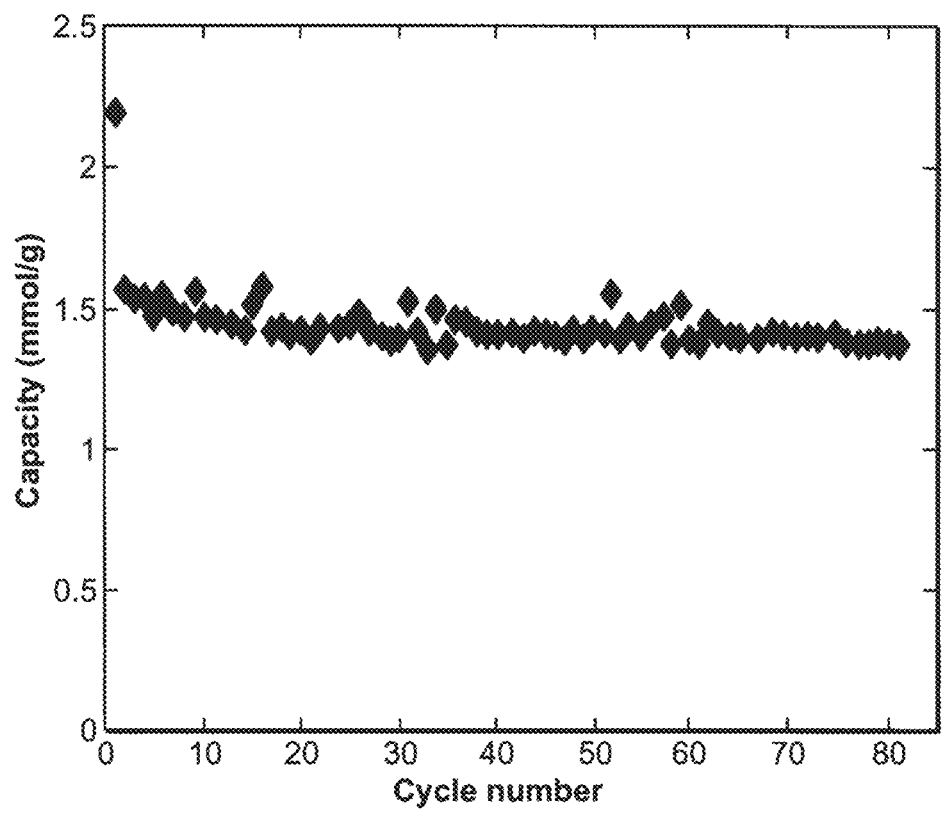
FIG. 7 is a graph of capacity against cycle number for sorbent at 200° C.

It was observed (FIG. 7) that the capacity at the 1st cycle is large, which is attributed to the combination of reversible and irreversible adsorption. The capacity decreases dramatically after the first cycle. Roughly 30% of the capacity cannot be regenerated using pressure change only as discussed above. The sorbent can only be completely regenerated at high temperature (723K).

After the first cycle, the sorbent can maintain a capacity of roughly 1.4 mmol/g. According to the study[18], the irreversibility arises from the formation of unidentate carbonates. The decrease of surface area could also contribute to the capacity reduction.

The sorbent capacity is lower than that of the commonly reported activated carbon and zeolites. But note that those sorbents are working at much lower temperature, and at low temperature, multilayer adsorption contributes to the high capacity. These multilayer sorbents do not work in our desired temperature range. On the other hand, calcium oxide and lithium based materials have a very large capacity at high temperature, but in those cases, the sorption is based on bulk reaction. The drawback of that sorption mode is the extremely slow kinetics associated with bulk reaction and species diffusion in a solid. The novel sorbent disclosed herein apparently captures $CO_2$ based on purely a surface reaction. One can treat it as a pseudo-single layer adsorption. Considering the surface area of the sorbent, the capacity data is reasonable.

Figure 8:
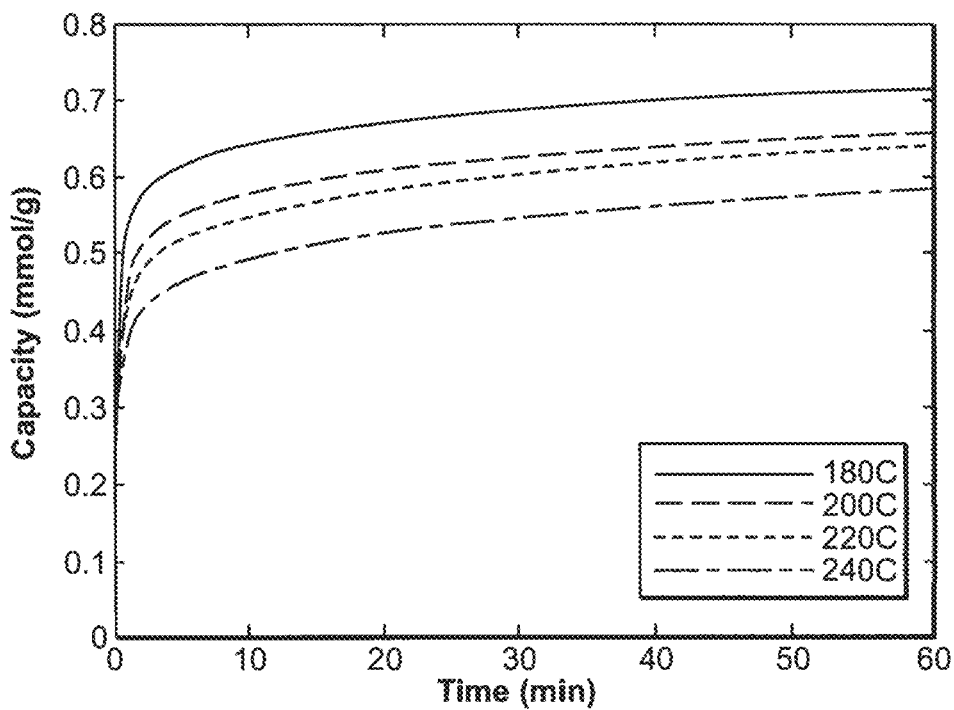
FIG. 8 is a thermogravimetric diagram of the sorbent disclosed herein when exposed to one atmosphere $CO_2$ at different temperatures.
Figure 9:
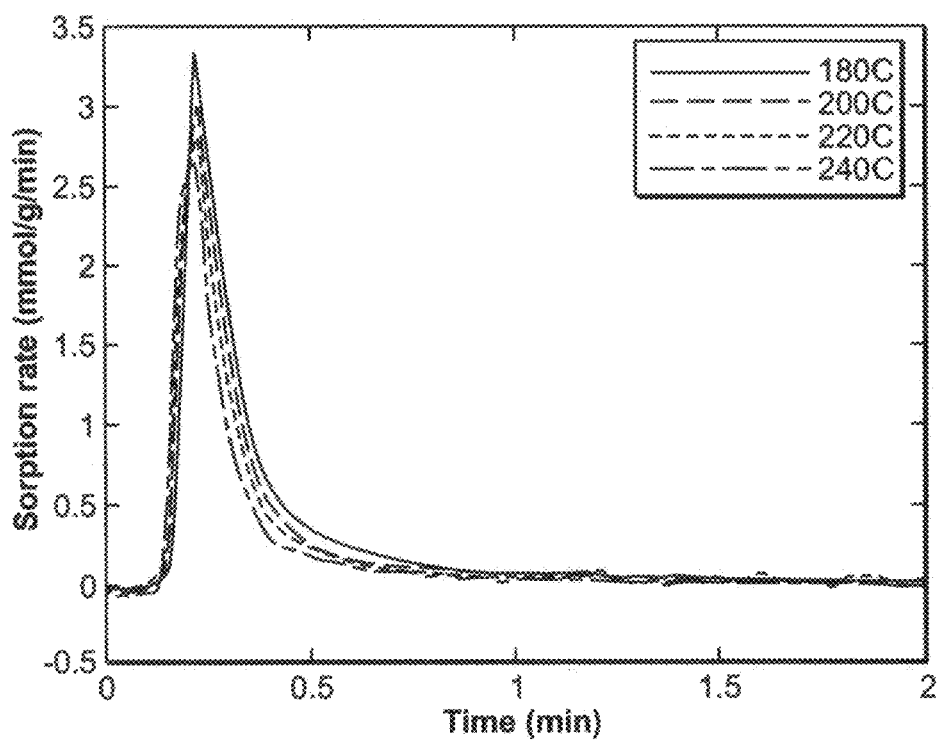
FIG. 9 is a graph of sorption rate against time at different temperatures when exposed to one atmosphere $CO_2$.

Adsorption rate is another important criterion in selecting a sorbent. To be applicable for pressure swing adsorption, the sorption rate needs to be fast to reduce the overall cycle time. FIG. 8 indicates that the weight increases rapidly in the first 2 minutes. The differential weight change indicates significant sorption in less than 1 min. Concerning the effect of temperature, we note that the sorption capacity decreases as temperature increases. But the sorption rate is slightly faster at higher temperature which is typical behavior for a chemical reaction. FIG. 9 shows sorption rate at different temperatures.

Compared with the sorption rate of commercially-available low temperature PSA sorbents, like activated carbon and zeolites, the sorption rate of our new sorbent is slower. That is because these sorbents capture $CO_2$ purely based on weak physical interaction. In those cases, the limiting step is mass transfer. However, in our case, the sorption mechanism is based on a surface chemical reaction. It is reasonable to observe a relatively slower sorption rate.

It should be noted that it is a common problem for high temperature sorbents to have slow sorption kinetics, because the sorption is based on chemical reaction, surface or bulk, rather than a weak physical interaction with lower energy barrier. Sorbents like calcium oxide and lithium-based materials capture $CO_2$ based on bulk reaction. The sorption kinetics can only be improved by increasing the working temperature or by doping which improves the bulk phase mass transfer. But the drawback for this sorption mode is bulk reaction normally leads to a change of crystal structure of sorbent. The sorbent needs a higher temperature to be regenerated, which always results in a decreasing working capacity. The material disclosed here captures $CO_2$ based on a surface reaction. What we want to stress here is, a sorbent with high surface area, high surface biding site density which captures $CO_2$ based on a weakly-exothermic surface reaction would reasonably be the better candidate for the PSA process in our temperature of interest (200-300° C.).

Figure 10:
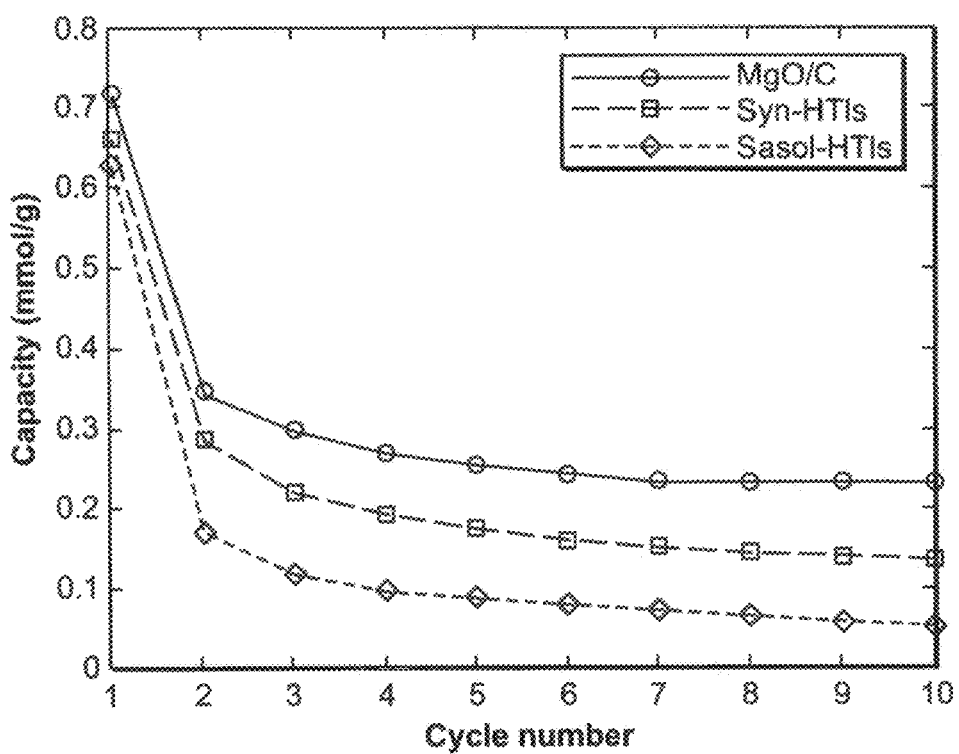
FIG. 10 is a graph of capacity against cycle number providing cyclic working capacity comparisons of the sorbent disclosed herein versus HTLs.
Figure 11:
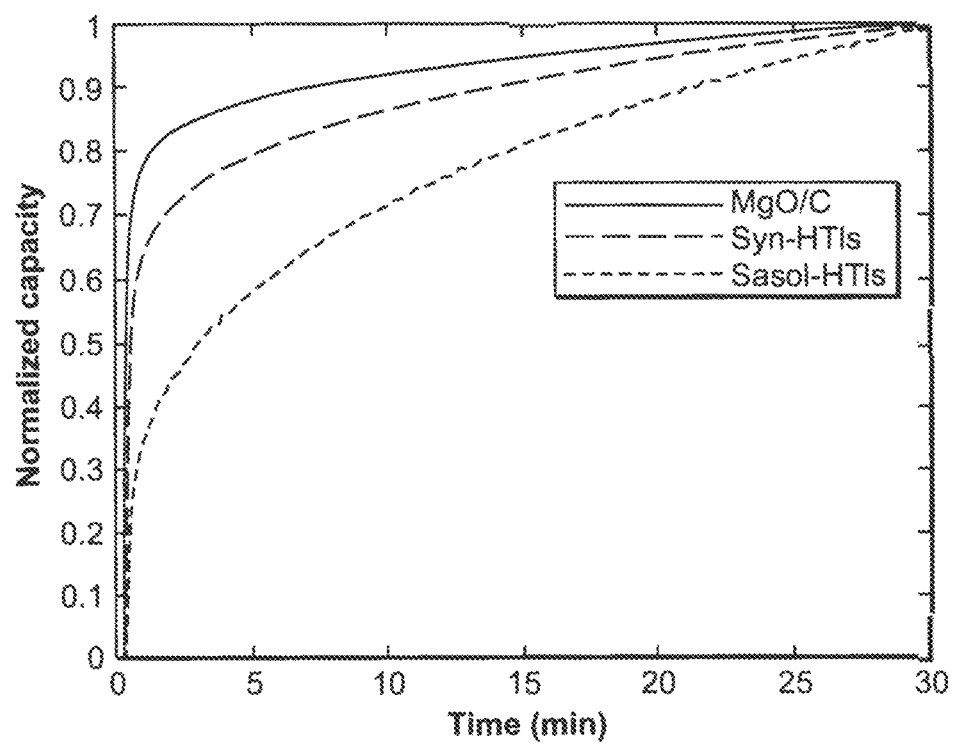
FIG. 11 is a graph of normalized capacity against time showing sorption rate comparisons.

To compare our sorbent with the well-studied HTls discussed above, a reversibility and kinetics comparison was performed in a TGA at 200° C. and 1 atm $CO_2$. As shown in FIG. 10, all materials show a large capacity in the first cycle, but the capacity of HTls dramatically decrease after the first cycle, indicating most of the surface reaction is irreversible at this temperature. The capacity for HTls keeps decreasing in the 10-cycle tests, while the MgO/C sorbent maintains a stable and larger reversible capacity. The sorption rate for these three samples was also compared. As shown in FIG. 11, the MgO/C has a much faster sorption rate compared with HTls at 200° C. These two comparisons indicate MgO/C is a better candidate for warm $CO_2$ capture in the temperature range of interest. MgO/C provides advantages over HTls in both regenerable capacity and sorption rate.

The superscript numbers refer to the list of references included herewith, the contents of all of which are incorporated herein by reference.

The sorbent disclosed herein has been rigorously analyzed in "Analysis of adsorbent-based warm CO2 capture technology for integrated Gasification Combined Cycle (IGCC) power plants," Ind. Eng. Chem. Res., the contents of which are incorporated by reference.

It is also recognized that a sorbent within the scope of this invention may begin with a magnesium compound other than MgO such as $Mg(OH)_2$ or $MgCO_3$ that will convert to MgO during operation thus failing within the scope of the appended claims.

It is recognized that modifications and variations of the invention will be apparent to those of ordinary skill in the art, and it is intended that all such modifications and variations be included within the scope of the appended claims.

REFERENCES (1) Solomon, S.; Qin, D.; Manning, M.; Marquis, M.; Averyt, K.; Tignor, M. M. B.; Miller, H. L.; Chen, Z. *Climate Change* 2007—*The Physical Science Basis*; Cambridge University Press, 2007; pp. 665-670.

(2) Katzer, J.; Ansolahehere, S.; Beer, J.; Deutch, J.; Ellerman, A. D.; Friedmann, S. J.; Herzog, H.; Jacoby, H. D.; Joskow, P. L.; McRae, G.; Lester, R.; Moniz, E. J.; Steinfeld, E. *The Future of Coal*; Massachusetts Institute of Technology, 2007.

(3) DOE/EIA *International Energy Outlook* 2001; 2011.

(4) Frey, H. C.; Zhu, Y. Improved system integration for integrated gasification combined cycle (IGCC) systems. *Environmental science & technology* 2006, 40, 1693-9.

(5) DOE/NETL *Fossil Energy Power Plant Desk Reference;* 2007.

(6) DOE/NETL *Cost and Performance Baseline for Fossil Energy Plants;* 2007; Vol. 1.

(7) DOE/NETL *Current and Future Technologies for Gasification-Based Power Generation;* 2010; Vol. 2.

(8) Schlatter, J.; Turk, B. Desulfurization Process versus Traditional Scrubbers for a Warm Syngas Cleanup Technologies, In *Gasification Technologies Conference;* 2007.

(9) Amelio, M.; Morrone, P.; Gallucci, F.; Basile, A. Integrated gasification gas combined cycle plant with membrane reactors: Technological and economical analysis. *Energy Conversion and Management* 2007, 48, 2680-2693.

(10) P., C.; Kreutz, T.; Lozza, G. CO2 Sequestration From IGCC Power Plants by Means of Metallic Membranes. 2007, 129, 123-134.

(11) Grainger, D.; Hägg, M.-B. Techno-economic evaluation of a PVAm CO2-selective membrane in an IGCC power plant with CO2 capture. *Fuel* 2008, 87, 14-24.

(12) Ito, S.; Makino, H. Carbon Dioxide Separation from Coal Gas by Physical Adsorption at Warm Temperature. In *Greenhouse Gas Control Technologies;* 1998; pp. 131-136.

(13) Cooling, D. J.; Prakash, K.; Green, W. H. Analysis of Membrane and Adsorbent Processes for Warm Syngas Cleanup in Integrated Gasification Combined-Cycle Power with CO2 Capture and Sequestration. *Ind. Eng. Chem. Re*. 2011, 50, 11313-11336.

(14) IUPAC REPORTING PHYSISORPTION DATA FOR GAS/SOLID SYSTEMS with Special Reference to the Determination of Surface Area and Porosity (Recommendations 1984), *Pure & Appl. Chem.* 1985, 57, 603-619.

(15) Sircar, S. Isosteric heats of multicomponent gas adsorption on heterogeneous adsorbents. *Langmuir* 1991, 7, 3065-3069.

(16) Sircar, S.; Mohr, R.; Ristic, C.; Rao, M. B. Isosteric Heat of Adsorption: Theory and Experiment. *J. Phys. Chem. B* 1999, 103, 6539-6546.

(17) Sircar, S. Excess properties and thermodynamics of multicomponent gas adsorption. *Journal of the Chemical Society, Faraday Transactions l* 1985, 81, 1527-1540.

(18) Leon, M.; Diaz, E.; Bennici, S.; Vega, A.; Ordonez, S.; Auroux, A. Adsorption of CO2 on Hydrotalcite-Derived Mixed Oxides: Sorption Mechanisms and Consequences for Adsorption Irreversibility. *Ind. Eng. Chem. Res.* 2010, 49, 3663-3671.

(19) Siriwardane, R. V.; Stevens, R. W. Novel Regenerable Magnesium Hydroxide Sorbents for CO2 Capture at Warm Gas Temperatures, *Ind. Eng. Chem. Res.* 2009, 48, 2135-2141.
(20) Ruthven, D. M.; Farooq, S.; Knaebel, K. S. *Pressure Swing Adsorption*; VCH Publisher, 1994; pp. 221-264.
(21) Kyaw, K.; Shibata, T.; Watanabe, P.; Matsuda, H.; Hasatani, M. Applicability of zeolite for CO2 storage in a CaO—CO2 high temperature energy storage system. *Energy Conversion and Management* 1997, 38, 1025-1033.
(22) Díaz, E.; Muñoz, E.; Vega, A.; Ordóñez, S. Enhancement of the CO(2) retention capacity of X zeolites by Na- and Cs-treatments. *Chemosphere* 2008, 70, 1375-82.
(23) Díaz, E.; Muñoz, E.; Vega, A.; Ordóñez, S. Enhancement of the CO 2 Retention Capacity of Y Zeolites by Na and Cs Treatments: Effect of Adsorption Temperature and Water Treatment. *Ind. Eng. Chem. Res.* 2008, 47, 412-418.
(24) Beruto, D.; Botter, R.; Searcy, A. W. Thermodynamics and Kinetics of Carbon Dioxide Chemisorption on Calcium Oxide, *J. Phys. Chem* 1984, 88, 4052-4055.
(25) Filitz, R.; Kierzkowska, A. M.; Broda, M.; Müller, C. R. Highly efficient CO2 sorbents: development of synthetic, calcium-rich dolomites. *Environmental science & technology* 2012, 46, 559-565.
(26) Nakagawat, K.; Ohashi, T. A Novel Method of CO2 Capture from High Temperature Gases. *J. Electrochem. Soc.* 1998, 145, 1344-1346.
(27) Bretado, M. E.; Guzmán Velderrain, V.; Lardizábal Gutiérrez, D.; Collins-Martínez, V.; Ortiz, A. L. A new synthesis route to Li4SiO4 as CO2 catalytic/sorbent. *Catalysis Today* 2005, 107-108, 863-867.
(28) Gauer, C.; Heschel, W. Doped lithium orthosilicate for absorption of carbon dioxide. *Journal of Materials Science* 2006, 41, 2405-2409.
(29) Siriwardane, R. V.; Robinson, C.; Shen, M.; Simonyi, T. Novel Regenerable Sodium-Based Sorbents for CO 2 Capture at Warm Gas Temperatures. *Energy & Fuels* 2007, 21, 2088-2097.
(30) Ding, Y.; Alpay, E. Equilibria and kinetics of CO2 adsorption on hydrotalcite adsorbent. *Chemical Engineering Science* 2000, 55, 3461-3474.
(31) Yong, Z.; Rodrigues, A. E. Hydrotalcite-like compounds as adsorbents for carbon dioxide. *Energy Conversion and Management* 2002, 43, 1865-1876.
(32) Mayorga, S. G.; Weigel, S. J.; Gaffney, T. R.; Brzozowski, J. R. *Carbon Dioxide Adsorbents Containing Magnesium Oxide Suitable for Use at Hight Temperature*; U.S. Pat. No. 6,280,503 B1.
(33) Singh, R.; Ram Reddy, M. K.; Wilson, S.; Joshi, K.; Diniz da Costa, J. C.; Webley, P. High temperature materials for CO2 capture. *Energy Procedia* 2009, 1, 623-630.
(34) van Selow, E. R.; Cobden, P. D.; Verbraeken, P. a.; Hufton, J. R.; van den Brink, R. W. Carbon Capture by Sorption-Enhanced Water—Gas Shift Reaction Process using Hydrotalcite-Based Material. *Industrial & Engineering Chemistry Research* 2009, 45, 4184-4193.
(35) van Selow, E. R.; Cobden, P. D.; Wright, a. D.; van den Brink, R. W.; Jansen, D. Improved sorbent for the sorption-enhanced water-gas shift process. *Energy Procedia* 2011, 4, 1090-1095.
(36) Larson, E. D.; Jin, H.; Celik, F. E. Large-scale gasification-based coproduction of fuels and electricity from switchgrass. *Biofuels, Bioproducts and Biorefining* 2009, 5, 174-194.
(37) Chiesa, P.; Consonni, S.; Kreutz, T. Co-production of hydrogen, electricity and CO from coal with commercially ready technology. Part A: Performance and emissions. *International Journal of Hydrogen Energy* 2005, 30, 747-767.
(38) Kreutz, T.; Williams, R.; Consonni, S.; Chiesa, P. Co-production of hydrogen, electricity and CO from coal with commercially ready technology. Part B: Economic analysis. *International Journal of Hydrogen Energy* 2005, 30, 769-784.

What is claimed is:

1. Method for capture of $CO_2$ by reversible pressure swing adsorption comprising contacting $CO_2$ in a temperature range of 200-300° C. with a material selected from the group consisting of activated carbon, metal-organic frameworks, zeolites, activated alumina, and mesoporous silica impregnated with at least 5% by weight MgO.

2. The method of claim 1 wherein the MgO constitutes approximately 15% by weight of the material/MgO combination.

* * * * *